United States Patent [19]
Pinat

[11] 3,844,398
[45] Oct. 29, 1974

[54] SELF-CENTERING DUAL BELT CONVEYOR

[76] Inventor: Gaston Pinat, 5384 Jules Fournier St., Montreal North, Province of Quebec, Canada

[22] Filed: Jan. 15, 1973

[21] Appl. No.: 323,825

[52] U.S. Cl.......... 198/165, 144/242 R, 144/246 R, 198/29, 226/172, 226/174
[51] Int. Cl............................................. B27b 31/00
[58] Field of Search............ 198/29, 165, 102, 205; 144/242 R, 242 D, 242 E, 245 R, 245 A, 246 R, 246 F, 249 B, 136 R; 226/172, 174; 214/1 PB

[56] References Cited
UNITED STATES PATENTS

| | | | |
|---|---|---|---|
| 1,333,006 | 3/1920 | Welser | 198/165 X |
| 2,794,466 | 6/1957 | Leffler | 144/246 F |
| 2,821,220 | 1/1958 | Nicholson | 144/242 R |
| 3,045,728 | 7/1962 | Hutchinson et al. | 144/208 |
| 3,275,125 | 9/1966 | Prentice | 198/205 |

Primary Examiner—Richard A. Schacher
Assistant Examiner—Jeffrey V. Nase
Attorney, Agent, or Firm—Pierre Lesperance

[57] ABSTRACT

A conveyor including a pair of endless belts defining mutually facing operative runs and arranged to be laterally equally displaced towards and away from each other to produce a centering action on a log, cant or other elongated member of variable diameter being conveyed between the mutually facing runs. Supports pivotally carry each end of each endless belt and a spring and an interconnecting link are operatively connected at each end of the endless belts between the corresponding pair of supports to bias the latter towards each other and produce opposite pivoting of the same. The link has a lost motion interconnection to allow within adjustable limits convergence or divergence of the two conveyor belts, so that the latter may efficiently engage tapering logs or cants.

7 Claims, 17 Drawing Figures

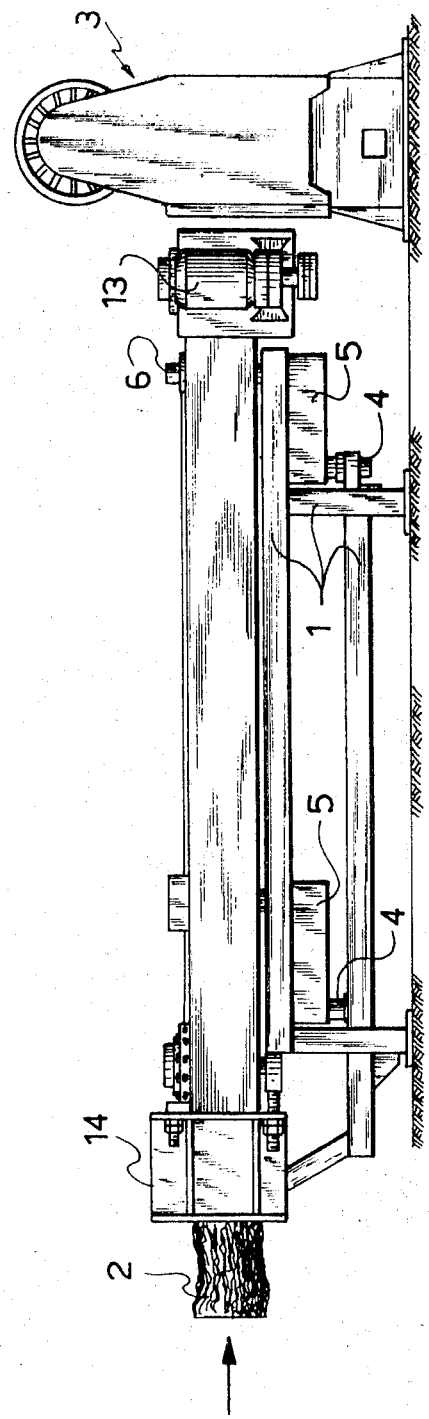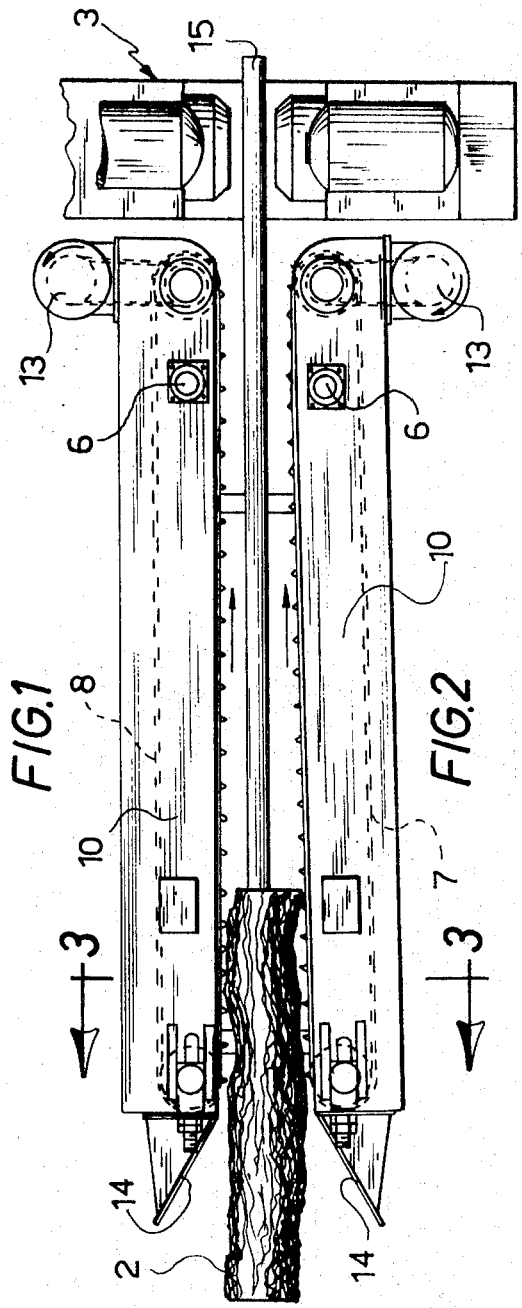

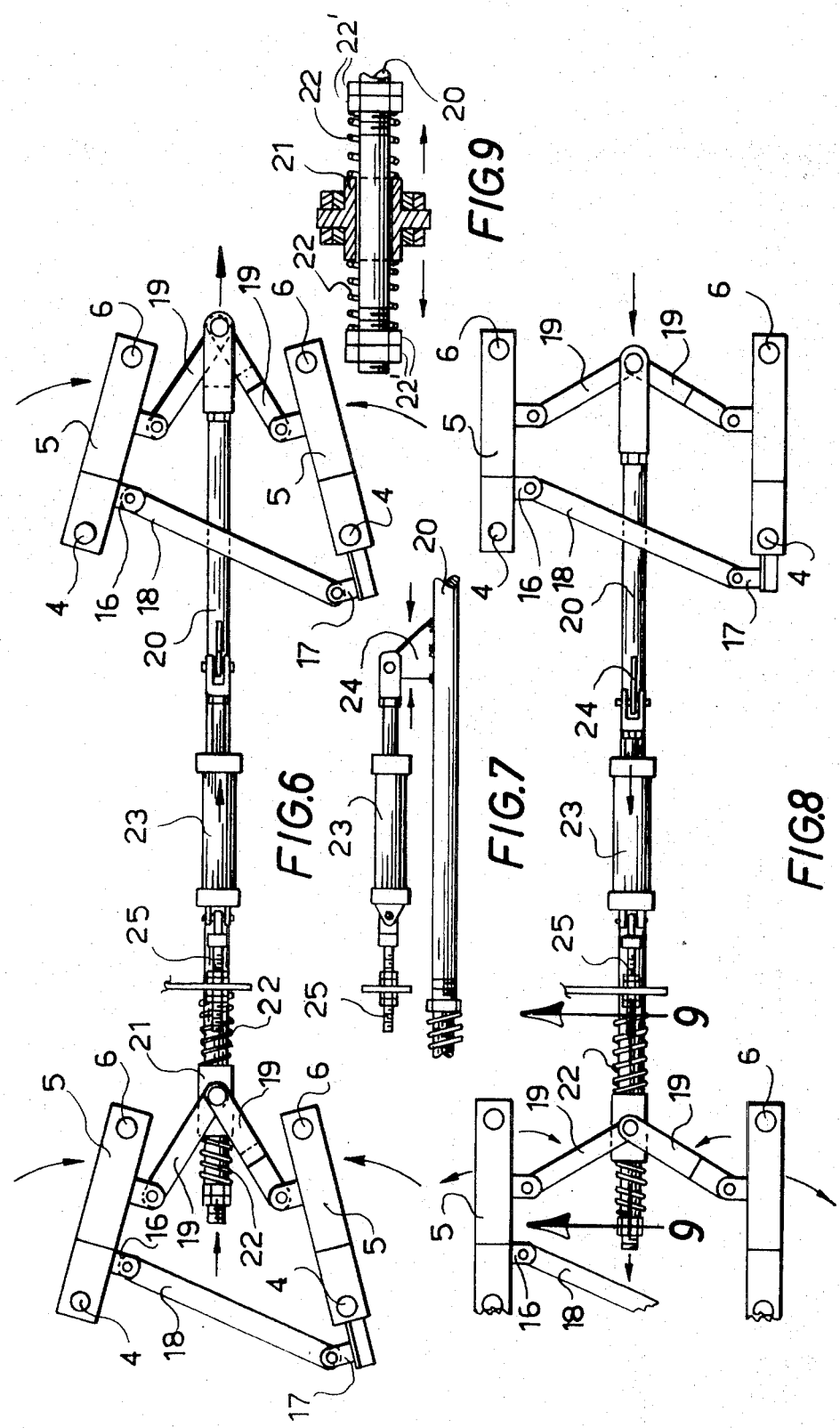

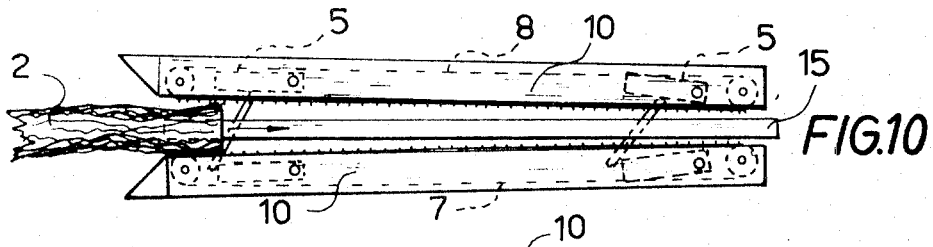
FIG.10
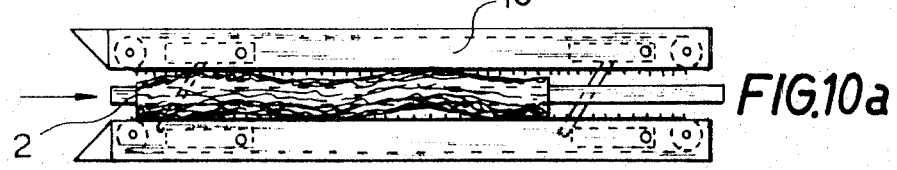
FIG.10a
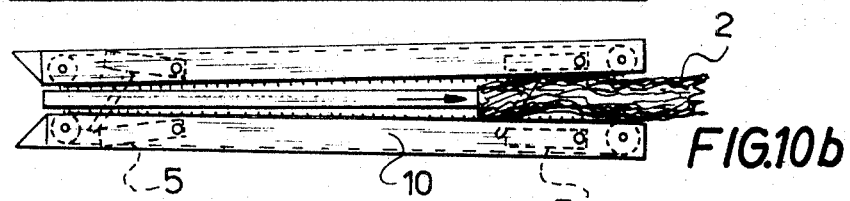
FIG.10b
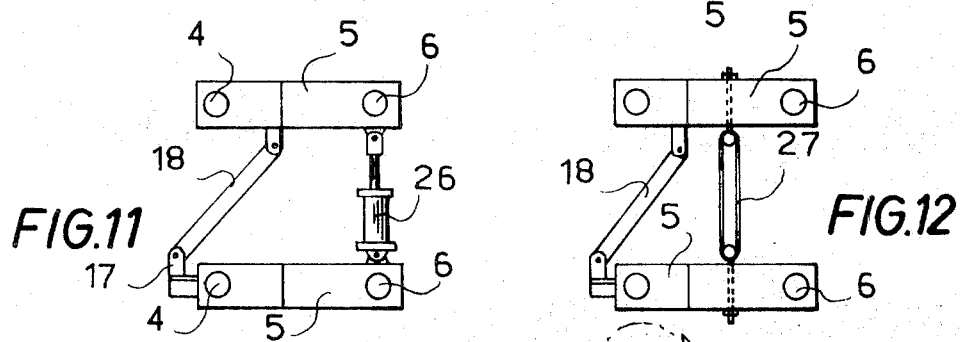
FIG.11
FIG.12
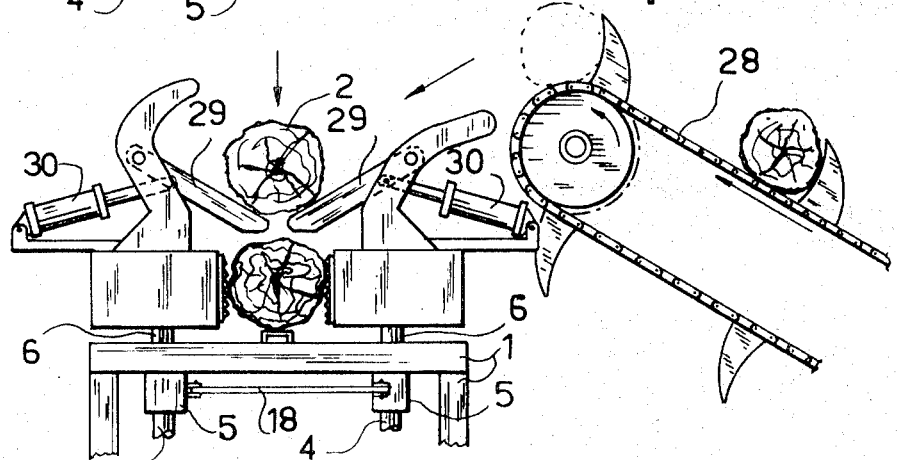
FIG.13

SELF-CENTERING DUAL BELT CONVEYOR

This invention relates to a conveyor and, more particularly, to a dual belt conveyor of the type used in timber cutting machines.

The conveyor of the above type includes a pair of endless belts which have mutually facing runs arranged to convey a piece of timber, such as a log or a cant, towards a cutting device or tool. In order to properly cut such timber, the latter must be aligned and centered relative to the cutter. Such centering is relatively difficult, since the logs and cants vary in diameter and generally have a larger end and irregularities, such as bends and knots. Besides, the logs and cants are heavy and a strong force is required to laterally displace the same.

It is a general object of the invention to provide a selfcentering dual belt feeding conveyor adapted to automatically and positively center and engage logs or cants of various diameters and whether they are tapered or not.

It is a more specific object of the invention to provide selfcentering dual belts which are allowed to come closer together at one end relative to the other, whereby to engage tapering logs along most of the length thereof for more efficient conveying action thereon. It is another object of the invention to limit the angle of convergence or divergence of the two belts in order to facilitate end feeding and discharge of the logs or cants.

It is still another object of the invention to provide a self-centering dual belt conveyor with means to selectively move the two belts and toward each other so that the conveyor can be associated with a log admitting mechanism arranged for faster and more positive and accurate side feeding of logs between the endless belts.

The invention is now defined in detail with reference to preferred embodiments thereof which are illustrated by way of example only in the accompanying drawings, wherein:

FIG. 1 is a side view of a timber cutting machine embodying a self-centering dual belt conveyor according to the invention;

FIG. 2 is a top view of the timber cutting machine shown in FIG. 1;

Figure 3:
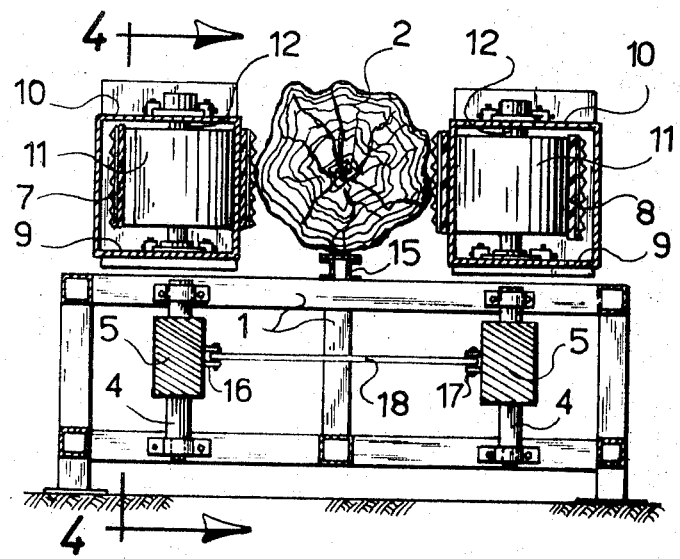
FIG. 3 is a cross-sectional view as seen along line 3—3 in FIG. 2.
Figure 4:
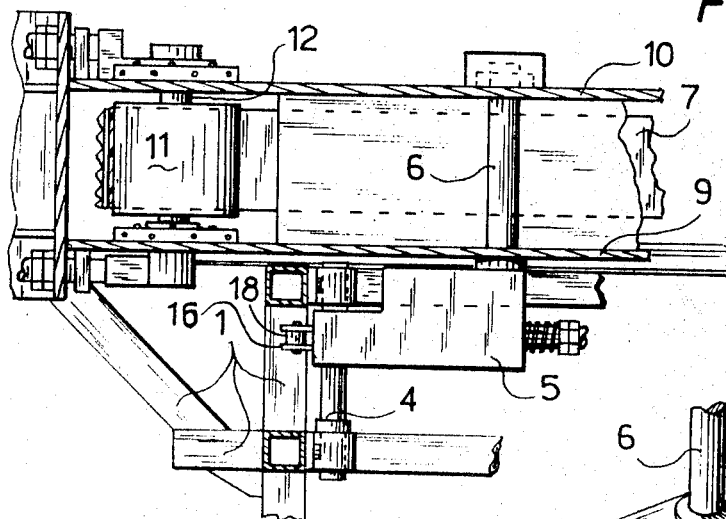
FIG. 4 is a cross-sectional view as seen along line 4—4 in FIG. 3.
Figure 5:
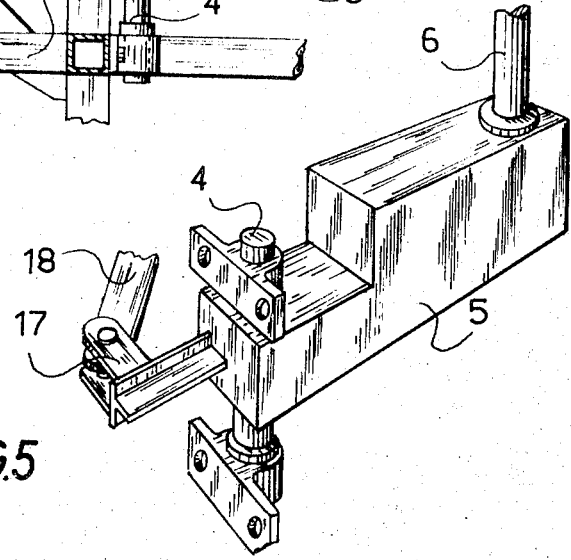
FIG. 5 is a perspective view of a pivoted support forming part of the self-centering assembly shown in FIG. 4 according to a preferred embodiment of the invention.
Figure 14:
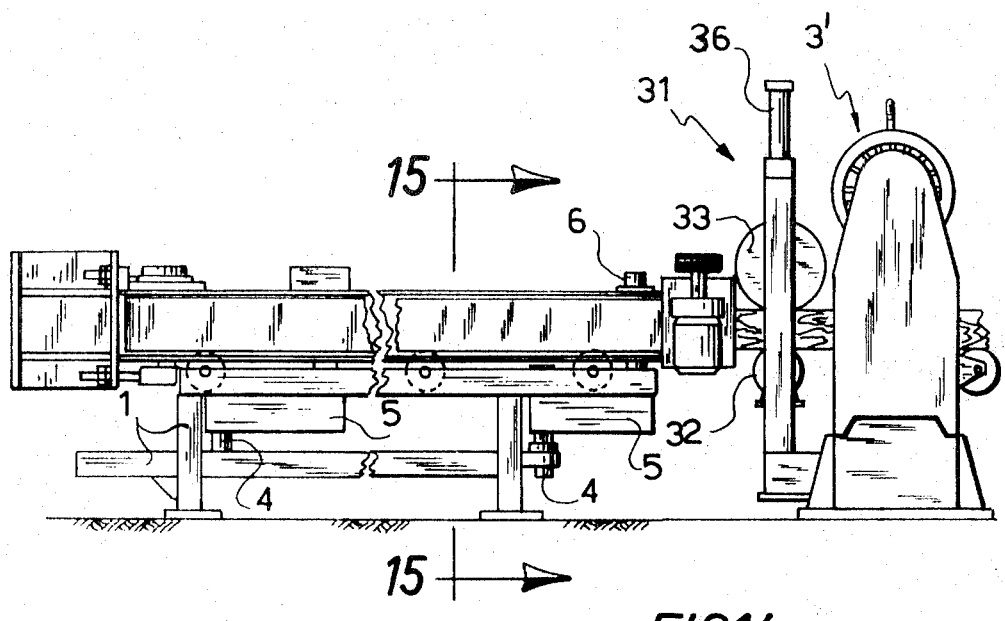
Figure 15:
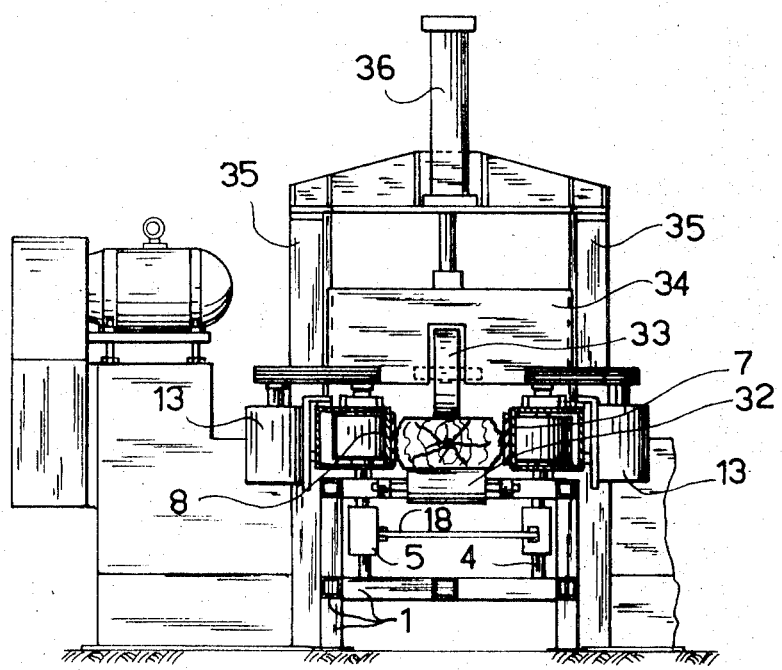

FIGS. 6, 7, and 8 are sequential illustrations of the operation of the self-centering assemblies according to the preferred embodiment of the invention;

FIG. 9 is a cross-sectional view as seen along line 9—9 in FIG. 8;

FIGS. 10, 10a, and 10b are sequential illustrations of the passage of a log between a pair of conveyors forming part of the machine of FIGS. 1 and 2;

FIGS. 11 and 12 are schematic illustrations of two other embodiments of a self-centering assembly according to the invention;

FIG. 13 is an end view of a timber cutting machine including a top feeding mechanism for the timber;

FIG. 14 is a side view of a cant chipping machine including the self-centering dual belt conveyor according to the invention; and FIG. 15 is a cross-sectional view as seen along line 15—15 in FIG. 14.

The timber cutting machine illustrated in FIGS. 1 and 2 includes a frame 1 of sturdy construction carrying a timber conveyor arranged to convey a log 2, cant or the like timber piece towards a cutting assembly 3. The frame 1 may, for instance, be made of strong steel pieces welded or otherwise joined together.

A self-centering assembly is secured at each end of the frame 1 and includes a pair of upright pivots 4 carried parallel to each other by suitable bearing blocks fixed to the frame 1. A supporting block 5 is carried by each pivot 4 for pivotal movement therewith and carries an upright stud 6 anchored therein parallel to the corresponding pivot 4.

Each endless belt 7 and 8 is carried by a casing or frame having a bottom and top plates 9 and 10 respectively. One upright stud 6 extends through the bottom and top plates 9 and 10 at each end of each endless belt 7 and 8 and is pivotally engaged therethrough. A roller element or drum 11 is rotatably mounted between the plates 9 and 10 at each end thereof by an axle 12 extending through the latter. Each endless belt 7 and 8 is looped around the pair of drums 11 located at opposite ends of each set of plates 9 and 10. The endless belts 7 and 8 form mutually facing conveying runs extending outside the casings formed by the plates 9 and 10. The outside face of each endless belt 7 and 8 is formed with dents or projections to give more traction thereto. A motor 13 is secured to each casing formed with the plates 9 and 10 and is suitably connected to the corresponding endless belts 7 and 8 to drive the latter in opposite directions such that the inner facing runs of the belts will move in the same feeding direction. Funneling plates or blocks 14 are secured to adjacent ends of the casings of the belts 7 and 8 and are arranged to guide the leading end of the log 2, cant or other elongated member. A central guide straight rail 15 is secured onto the frame 1 intermediate the two endless belts and is provided to support the timber during its course lengthwise of the belts.

Ears or lugs 16 and 17 are secured to the supporting blocks 5 and a pushpull link 18 pivotally joins each set of lugs or ears 16 and 17 of adjacent blocks 5, transversely through the plane passing by the pivots 4 and on opposite sides of the pivots 4. As will be readily understood, the pushpull link 18 produces positive and equal pivoting of the blocks 5 towards or away from each other.

A pair of levers 19 forming a toggle lever mechanism have one end pivoted one to the other and their opposite ends pivoted to the supporting blocks 5 in each of the two centering assemblies. A rigid link 20 extends lengthwise of the endless belts and is connected directly at one end to said one end of a pair of levers 19. A block 21 is slidable onto the rigid link 20 and a pair of springs 22 act against the opposite sides of the block 21 and against adjustable stop nuts 22' to bias the same against displacement lengthwise of the rigid link 20. A pneumatic biasing spring 23 is connected at one end to an ear 24 of the rigid link 20 and is adjustably secured by a threaded portion 25 to a fixed portion of the frame 1. Block 21 and nuts 22' form a lost motion interconnection between the toggle lever mechanisms 19 at both ends of the conveyor system to allow, within adjustable limits, divergence or convergence of the two opposed conveyors. Springs 22 urge the two conveyors to take parallel positions.

When a log 2, a cant or other elongated member is end fed to the conveyor including the two endless belts, the end of the log spreads apart the inlet end of the two endless belts, the casing thereof and, consequently, the studs 6 and the pivoted supporting block 5. The push-pull link 18 produces equal pivoting of the supporting blocks 5 and a consequent centering of the log 2 between the belts 7 and 8 and relative to the cutting elements of the assembly 3. As the leading end of the lug 2 progresses further down between the endless belts from the position of FIG. 10 to that of FIG. 10a, the exit ends of the endless belts gradually spread apart. When the trailing end of the log 2 are approaching the exit end of the conveyor, the inlet end of the endless belts 7 and 8 are allowed to come closer together by sliding of the block 21 along the rigid link 20 and against the action of the springs 22. The endless belts are then allowed to adjust to the general tapering of a log or cant for better engagement of the belts therewith and a more expeditive conveying action thereof.

A second embodiment of a self-centering assembly according to the invention is shown in FIG. 11 and also includes the supporting blocks 5, the pushpull link 18 and the associated elements as in the first embodiment illustrated in FIGS. 1 to 10 inclusive. In this second embodiment, the interconnecting rigid link 20, the pneumatic biasing spring 23 and the associated elements are dispensed with. Instead, a pneumatic cylinder 26 forms a spring biasing the pair of supports 5 towards each other.

The self-centering assembly according to a third embodiment of the invention, as illustrated in FIG. 12, is generally similar to the embodiment of FIG. 11 with the exception that the pneumatic cylinder 26 is replaced by a rubber band 27 forming a spring to provide the necessary biasing of the supports 5 towards each other. Obviously, the embodiments of FIGS. 11 and 12 come in pair, one unit at the inlet and the second unit at the outlet of the conveyor.

FIGS. 1 to 10b inclusive illustrate in detail a self-centering arrangement embodied into a timber cutting machine which is end fed. As is illustrated in FIG. 13, the same self-centering arrangement as in FIGS. 1 to 10b inclusive may be embodied into a timber cutting machine which is top fed by a timber conveyor 28 and timber admitting fingers 29 and timber releasing cylinders 30. The only modification to the already described self-centering arrangement is to replace pneumatic biasing spring 23 by a double-acting pneumatic cylinder which also acts as a pneumatic biasing spring.

The timber admitting fingers 29 are aligned into two rows and are inclined inwardly to form a rest for a log 2. An actuating cylinder 30 is connected to each finger 29 and arranged to depress the latter, thereby causing admission or drop of the log 2 between the two endless belts 7 and 8. Preferably, the actuating cylinders are operatively coupled to the above-mentioned double-acting pneumatic cylinder to simultaneously actuate the same to spread apart the endless belts 7 and 8 for the clear admission of a log 2 between the latter. The fingers 29 produce a faster and more positive feeding of the logs 2, since a log is always ready and in proper position to be fed to the endless belts conveyor, with minimum impact on the latter.

As shown in FIGS. 14 and 15, the self-centering assemblies according to the invention are also adapted to be embodied into the dual belt conveyor of a chipper canter machine, the particularities of which will now be defined.

This machine includes a cutting or chipping head 3', which is known per se and need not be described. A guillotine assembly 31 is positioned intermediate the endless belts conveyor and the chipping head 3' and includes rollers 32 and 33 which are provided to firmly hold the cant during the chipping thereof. The top roller 33 is rotatably carried by a guillotine member 34 slidable up and down in guiding engagement with the uprights 35. An actuating cylinder 36 is connected to the guillotine member 34 to raise the latter for the insertion of a cant between the rollers 32 and 33.

What I claim is:

1. A self-centering dual belt feeding conveyor for feeding logs and cants to a wood processing machine in a straight feeding path, comprising an elongated frame extending along said path, a substantially horizontal straight support rail mounted on said frame to support a log or cant in said path, a pair of transversely aligned conveyors mounted on each side of said path with an inner run facing each other and power driven in the same direction for receiving between said inner runs, logs or cants of different diameters and different tapers to be guided and fed to a wood processing machine by said inner runs, each conveyor including an endless conveyor belt means and roller elements longitudinally spaced along said path and on which the ends of the conveyor belt means are trained, said roller elements forming a transverse pair at each end of the respective conveyor belt means, the roller elements of each pair being substantially transversely aligned and mounted on said frame for movement towards and away from each other transversely of said path, whereby to increase or decrease the gap between said conveyor belt means, centering means to positively maintain the two roller elements of each pair at an equal transverse distance from a vertical plane passing through the longitudinal axis of said support rail independently of the width of said gap, means biasing said roller elements of each pair in a direction to decrease said gap and means to resiliently allow unequal gap width between the two pairs of roller elements, whereby a log or cant inserted within said gap is positively centered in said path independently of its diameter, while said conveyor belts can take diverging or converging positions to engage logs or cants of variable taper.

2. A self-centering dual belt feeding conveyor as claimed in claim 1, further including means to limit the difference of gap width between the two pairs of roller elements so as to limit the degree of divergence or convergence of said conveyor belt means.

3. A self-centering dual belt feeding conveyor as claimed in claim 1, further including means to positively move the roller elements of each pair apart and toward each other, thereby to increase or decrease the overall gap width so that a log or cant positioned horizontally over and along said rail, can be dropped within said gap when said roller elements are moved apart and then positively engaged by said belt means wheen said roller elements are moved toward each other.

4. A self-centering dual belt feeding conveyor as claimed in claim 1, further including a support arm for each roller element disposed on opposite sides of said support rail and pivotally mounted near one end on said frame for pivotable movement in a horizontal plane, each support carrying one of said roller elements at its outer end for rotation about a vertical axis.

5. A self-centering dual belt feeding conveyor as claimed in claim 4, wherein said supports are arranged in pairs transversely aligned relative to said path, said centering means including for each pair of supports a push pull link pivotally interconnecting the supports of the pair on opposite sides of their pivotal mounting on said frame and toggle lever means pivotally interconnecting said pairs of pivoted supports at points spaced from their pivotal mounting, said biasing means acting on said toggle lever means in a direction to urge approaching movement of the roller elements in each pair.

6. A self-centering dual belt feeding conveyor as claimed in claim 5, wherein said biasing means include a double-acting pneumatic cylinder and piston unit serving also as means to positively move the roller elements of each pair apart and toward each other.

7. A self-centering dual belt feeding conveyor as claimed in claim 5, wherein said limiting means include a rigid link having a pivotal interconnection with the toggle levers of each pair of supports, at least one of said pivotal interconnection being a lost motion interconnection within limits, and further including spring means associated with said lost motion interconnection and urging the same to a position causing equal gap between the two pairs of roller elements.

* * * * *